United States Patent
O'Lenick, Jr.

(10) Patent No.: US 7,335,720 B1
(45) Date of Patent: *Feb. 26, 2008

(54) POLYESTERS BASED UPON DIMER ACID IN PERSONAL CARE

(75) Inventor: Anthony J. O'Lenick, Jr., Dacula, GA (US)

(73) Assignee: ZeniTech Corporation, Old Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/818,988

(22) Filed: Jun. 18, 2007

Related U.S. Application Data

(63) Continuation-in-part of application No. 11/073,109, filed on Mar. 7, 2005, now Pat. No. 7,259,226.

(51) Int. Cl.
*C08G 63/02* (2006.01)

(52) U.S. Cl. .................................................. 528/272
(58) Field of Classification Search ................. 528/272
See application file for complete search history.

(56) References Cited

U.S. PATENT DOCUMENTS 6,537,531 B1  3/2003  Gardner et al.

*Primary Examiner*—Yvonne Eyler
*Assistant Examiner*—Jennifer Y Cho

(57) ABSTRACT

The present invention is related to the cosmetic utilization of a series of polyesters based upon the reaction of dimer acid, dimer alcohol and Guerbet alcohol. The resulting polyester is a high molecular weight product that is well tolerated by the skin and has outstanding emolliency. The Guerbet alcohol, being mono hydroxyl is a capper portion of the polymer, the dimer alcohol is a chain extender having two hydroxyl groups and the dimer acid is a diacid that reacts with the hydroxyl groups on the Guerbet and dimer alcohol to make the polyester.

18 Claims, No Drawings

POLYESTERS BASED UPON DIMER ACID IN PERSONAL CARE

RELATED APPLICATION

This application is a continuation in part of Ser. No. 11/073,109 filed Mar. 7, 2005 now U.S. Pat. No. 7,259,226.

BACKGROUND OF THE INVENTION

1. Field of the Invention

The present invention is related to the cosmetic utilization of a series of polyesters based upon the reaction of dimer acid, dimer alcohol and Guerbet alcohol. The resulting polyester is a high molecular weight product that is well tolerated by the skin and has outstanding emolliency. The Guerbet alcohol, being mono hydroxyl is a capper portion of the polymer, the dimer alcohol is a chain extender having two hydroxyl groups and the dimer acid is a diacid that reacts with the hydroxyl groups on the Guerbet and dimer alcohol to make the polyester. The compounds are effective skin and hair conditioners. The preferred concentration conditioning concentration ranges from 0.2% to 10% by weight.

2. Description of the Art Practices

There is a long felt desire to develop an ester that gives gloss to the skin when applied from oils or applied from emulsions. An added aspect of the present invention is the fact that the compounds are polymeric. This has two very important implications on the use of the materials of the present invention. The polymeric nature means the compounds do not penetrate the skin. The fact that these molecules remain on the skin, increases gloss and provides a less irritation to the skin. They also provide a gloss that is more long lasting.

U.S. Pat. No. 5,786,389 issued July 1998 to O'Lenick, incorporated herein by reference, describes the use of a Guerbet ester of castor for gloss. The compounds are a simple ester made by the reaction of castor and a specific mono functional alcohol to produce an ester. The products of this patent are neither polymeric, nor do they involve reaction of the hydroxyl group in the castor molecule. We have discovered that higher gloss, lower irritation and better durability of gloss results when one makes the polymers of the present invention.

U.S. Pat. No. 6,342,527 to O'Lenick, Jr., et al. issued Jan. 29, 2002 entitled Polymeric castor polyesters relates to a series of polyester compounds derived from castor oil. Castor oil, a hydroxy containing oil, can be esterified with a fatty acid to produce an intermediate having both an ester and triglyceride functionality. By selecting the ratios of reactants, the castor can be a partially substituted with fatty acid leaving some unreacted hydroxyl groups. The number of remaining hydroxyl groups, and the type and concentration of diacid used to react with the unreacted hydroxyl groups, results in a controllable polyester. The control of molecular weight and degree of polymerization is critical to functionality of the product.

U.S. Pat. No. 6,706,259 issued Mar. 16, 2004 to Gardner, et al., incorporated herein by reference, discloses hydrolytically stable esters. These esters are simple esters of the dimer alcohol and a mono fatty acid. The compounds are not polyester, since no crosslinking ester is included in the molecule and no capper is used.

U.S. Pat. No. 6,537,531 issued Mar. 25, 2003 to Gardner, et al., incorporated herein by reference, discloses hydrolytically stable esters based upon Guerbet acids. Again like the '259 reference above, these esters are simple esters of the dimer alcohol and a mono Guerbet branched fatty acid. The compounds are not polyester, since no crosslinking ester is included in the molecule and no capper is used.

The Gardner references show long felt need for products that do not penetrate the skin, provides gloss and does not effect trans epidermal water loss.

THE INVENTION

One aspect of the invention is a process for conditioning hair which comprises contacting the hair with an effective conditioning concentration of a polyester conforming to the following structure:

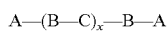

wherein:

A is

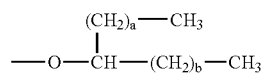

wherein;

a in an integer ranging from 3 to 11;

b in an integer ranging from 5 to 19, with the proviso that b=a+2;

B is selected from the group consisting of:

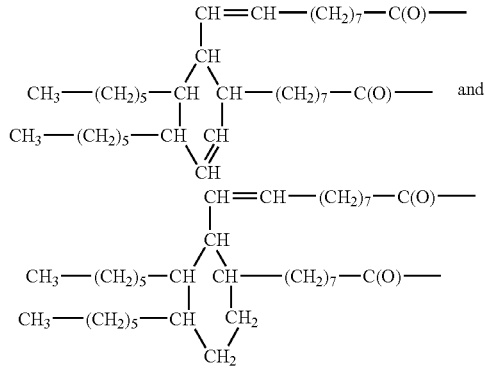

C is compounds selected from a group consisting of:

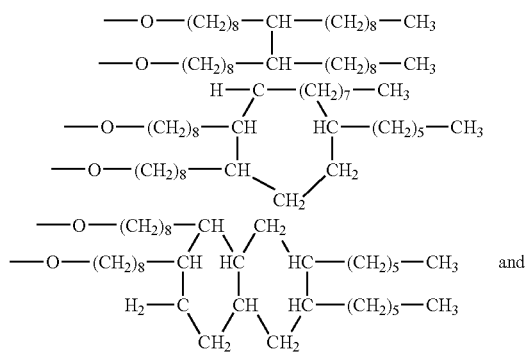

-continued

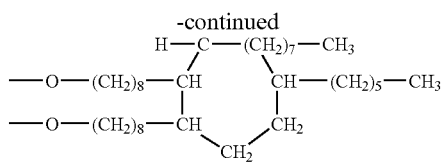

wherein;

x is an integer ranging from 3 to 40.

As should be readily understood the dimer acid is a diacid that will react with hydroxyl groups to make esters. It will react with the various diols making up the dimer alcohol to make polyesters, that is each succinic carboxyl group will react with each hydroxyl group. Dimer acid is used either as is conforming to the following structure:

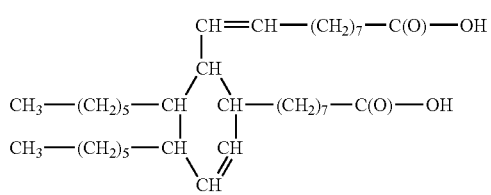

or is hydrogenated to give the following structure:

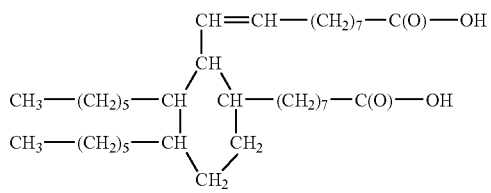

Lacking the essential Guerbet alcohol the resulting polymer would be simply a nonending polymer —(B—C)$_n$—. The viscosity would climb to very high levels and the product would be too thick to be functional.

The Guerbet alcohol is monofunctional providing a chain terminator and a way to control the molecular weight. The specific branched alcohol also provides low viscosity and gloss. This allows for the preparation of a high molecular weight low viscosity polymer which is highly prized in the cosmetic business. By regulating the ratio of Guerbet alcohol reacted the molecular weight is regulated, the more Guerbet, the lower the molecular weight.

Another aspect of the invention is a polyester prepared by the esterification reaction of (a) a Guerbet alcohol conforming to the following structure:

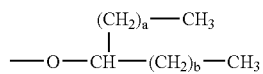

wherein;

a in an integer ranging from 3 to 11;

b in an integer ranging from 5 to 19, with the proviso that b=a+2;

(b) dimer acid conforming to one of the following structures:

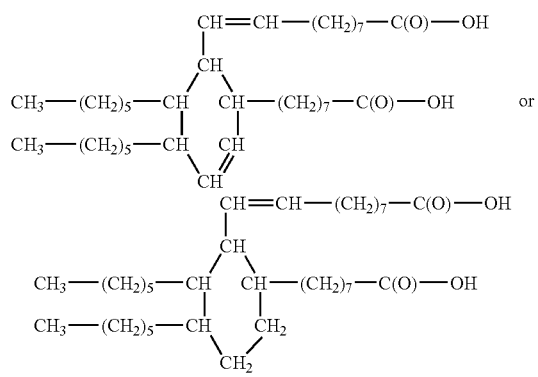

and (c) dimer alcohol, a mixture of compounds conforming to the following structures:

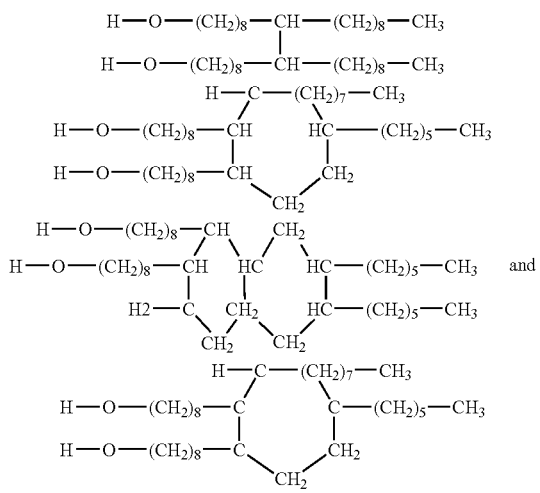

wherein;

x is an integer ranging from 3 to 40.

PREFERRED EMBODIMENTS

In a preferred embodiment the esterification reaction is carried out at a temperature of between 150 and 200° C. for four to eight hours.

In a preferred embodiment a is 3 and b is 5.
In a preferred embodiment a is 7 and b is 9.
In a preferred embodiment a is 9 and b is 11.
In a preferred embodiment a is 11 and b is 13.
In a preferred embodiment a is 13 and b is 15.
In a preferred embodiment a is 15 and b is 17.
In a preferred embodiment a is 17 and b is 19.

EXAMPLES

Raw Materials

Reactant 1—Guerbet Alcohols

Guerbet Alcohols are regiospecifically beta branched alcohols. They have been known since the 1890's when Marcel Guerbet first synthesized them. (M. Guerbet, C. R. Acad. Sci. Paris, 128, 511; 1002 (1899)). These materials are high in molecular weight and are liquid to very low temperatures. The Guerbet reaction gives very specific branching, on the second carbon from the hydroxyl group. This branching has been found to be critical to the preparation of a product having the desired lubrication and oxidative stability properties. If the branching were on the same carbon as the hydroxyl group, the hydroxyl group would be a secondary one and would be very hindered and has low reactivity. As one moves the branch position away from the beta carbon, the liquidity, lubricity and metal substantivity decreases. If the branch is lower alkyl like methyl in some oxo alcohols, there is little increase in the liquidity, lubricity and metal substantivity over normal alcohols having the same number of carbons. Additionally, the oxo process gives only some beta branching (between 1 and 28%) the Guerbet process gives essentially 100% product. Guerbet alcohols that are the reaction product of one specific raw material alcohol will result in a so-called "homo-Guerbet". In this case R and R' are identical. If the starting alcohols used in the Guerbet reaction are of differing molecular weights a so-called "hetero-Guerbet" results. This type of Guerbet has a mixed distribution of all possible combinations of alcohols. For this reason R and R' in the generic formula may be the same or different.

Guerbet alcohols are available commercially from Sassol Corporation, formerly called Condea Vista. Guerbet alcohols conform to the following structure:

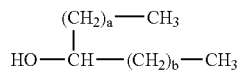

wherein;

a in an integer ranging from 3 to 11;

b in an integer ranging from 5 to 19.

It should be clear from the reaction sequence that the Guerbet alcohol is reacted into the ester, making a new-branched ester and leaving a free lanolin alcohol. The resulting composition contains a branched ester and an alcohol that is derived from the lanolin. The selection of the Guerbet and wax determines the melting point and the degree of hardness of the wax. This is very important in a variety of applications, like automotive polishes, and personal care products like lipsticks.

Guerbet Alcohol Examples

| Example | Designation | a | b |
|---------|-------------|----|----|
| 1 | Guerbet C12 | 3 | 5 |
| 2 | Guerbet C16 | 5 | 7 |
| 3 | Guerbet C20 | 7 | 9 |
| 4 | Guerbet C24 | 9 | 11 |
| 5 | Guerbet C28 | 11 | 13 |
| 6 | Guerbet C32 | 13 | 15 |
| 7 | Guerbet C36 | 15 | 17 |
| 8 | Guerbet C40 | 17 | 19 |

Reactant 2—Dimer Acid

Dimer acid is an item of commerce sold by Emery Industries Cincinnati Ohio and conforms the following structure:

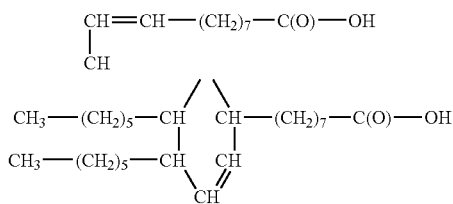

Hydrogenated dimer acid is an item of commerce sold by Emery Industries Cincinnati Ohio and conforms the following structure:

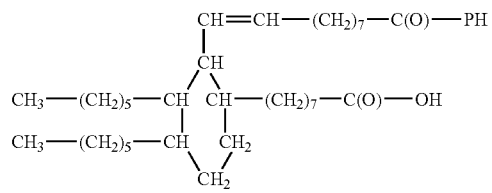

Reactant 3—Dimer Alcohol

Dimer alcohol is provided by a variety of sources including Jarchem. It is a composition containing the following components:

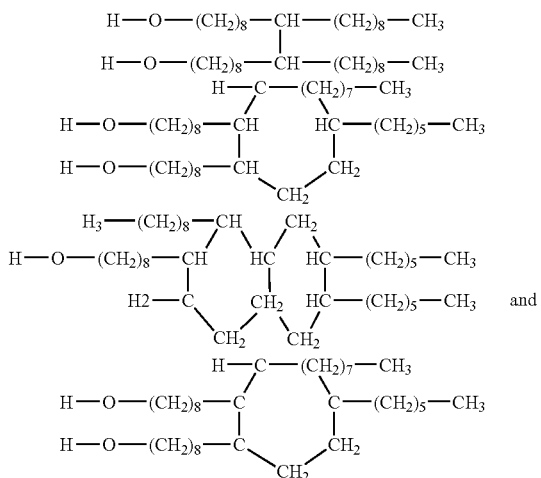

Ester Synthesis

The esterification reaction is carried out using the specified amount of dimer alcohol, dimer acid and the specified amount of the specified Guerbet alcohol. The esterification reaction can be carried out with or without catalyst, however when no catalyst is used the reaction times are protracted. Catalysts like benzene sulfonic acid, tin, sulfuric acid, tin salts and the like can be used. The most satisfactory catalyst is stannous oxylate.

General Procedure

In a suitable reaction flask with agitation, heat and thermometer is added the specified number of grams of dimer alcohol is added the specified number of grams of dimer acid. Next add the specified amount of the specified Guerbet alcohol (examples 1-8). Next add 0.1% stannous oxylate based upon the total weight of the batch after all ingredients have been charged, under agitation. The temperature of the mass is raised to 195-200 C off. The reaction mass is held at this temperature for between 4 and 15 hours, until the acid value drops to vanishingly small values.

| Guerbet Alcohol | | Dimer Alcohol | Dimer acid | |
|---|---|---|---|---|
| Example | Example | Grams | Grams | Grams | x Value |
| 9 | 1 | 376.0 | 807.0 | 1128.0 | 3 |
| 10 | 2 | 488.0 | 1345.0 | 1692.0 | 5 |
| 11 | 3 | 600.0 | 1883.0 | 2256.0 | 7 |
| 12 | 4 | 712.0 | 3228.0 | 3666.0 | 12 |
| 13 | 5 | 824.0 | 4035.0 | 4544.0 | 15 |
| 14 | 6 | 936.0 | 1345.0 | 1704.0 | 5 |
| 15 | 7 | 224.0 | 2690.0 | 11644.0 | 40 |
| 16 | 8 | 1160.0 | 5380.0 | 5964.0 | 20 |

The products are used without additional purification.

The polyesters of the present invention are high molecular weight, non-irritating esters that provide gloss and emolliency to skin. The high molecular weight as well as low viscosity make the materials ideal as a oil in which to grind pigments.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

I claim:

1. A process for conditioning hair and skin which comprises contacting the hair and skin with an effective conditioning concentration of a polyester conforming to the following structure:

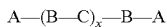

wherein:

A is

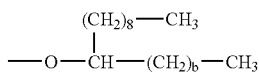

wherein;

a in an integer ranging from 3 to 11;

b in an integer ranging from 5 to 19, with the proviso that b=a+2;

B is selected from the group consisting of:

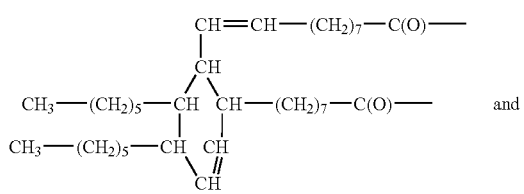

and

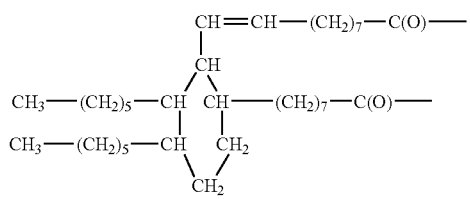

C is selected from the group consisting of:

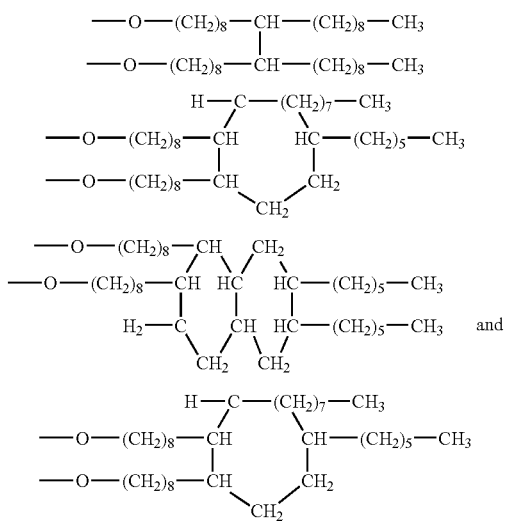

wherein;

x is an integer ranging from 3 to 40.

2. A process of claim 1 wherein said effective conditioning concentration ranges from 0.2% to 10% by weight.

3. A process of claim 1 wherein a is 3 and b is 5.

4. A process of claim 1 wherein a is 7 and b is 9.

5. A process of claim 1 wherein a is 9 and b is 11.

6. A process of claim 1 wherein a is 19 and b is 13.

7. A process of claim 1 wherein a is 13 and b is 15.

8. A process of claim 1 wherein a is 15 and b is 17.

9. A process of claim 1 wherein a is 17 and b is 19.

10. A process of claim 2 wherein a is 3 and b is 5.

11. A process of claim 2 wherein a is 7 and b is 9.

12. A process of claim 2 wherein a is 9 and b is 11.

13. A process of claim 2 wherein a is 11 and b is 13.

14. A process of claim 2 wherein a is 13 and b is 15.

15. A process of claim 2 wherein a is 13 and b is 17.

16. A process of claim 2 wherein a is 17 and b is 19.

17. A process of claim 1 wherein said effective conditioning concentration ranges from 0.5% to 5% by weight.

18. A process of claim 1 wherein said effective conditioning concentration ranges from 1.0% to 5% by weight.

* * * * *